US012695689B2

(12) United States Patent     (10) Patent No.:   US 12,695,689 B2
Pantelidou et al.     (45) Date of Patent:     Jul. 28, 2026

(54) ENABLING A FLEXIBLE MDT CONFIGURATION

(71) Applicant: Nokia Solutions and Networks Oy, Espoo (FI)

(72) Inventors: Anna Pantelidou, Massy (FR); Hakon Helmers, Massy (FR)

(73) Assignee: Nokia Solutions and Networks Oy, Espoo (FI)

( * ) Notice: Subject to any disclaimer, the term of this patent is extended or adjusted under 35 U.S.C. 154(b) by 344 days.

(21) Appl. No.: 18/448,637

(22) Filed: Aug. 11, 2023

(65) Prior Publication Data

US 2025/0055782 A1     Feb. 13, 2025

(51) Int. Cl.
    *H04L 41/0803*     (2022.01)
    *H04L 43/50*     (2022.01)
    *H04W 8/24*     (2009.01)
    *H04W 24/10*     (2009.01)

(52) U.S. Cl.
    CPC .......... *H04L 43/50* (2013.01); *H04L 41/0803* (2013.01); *H04W 8/24* (2013.01); *H04W 24/10* (2013.01)

(58) Field of Classification Search
    None
    See application file for complete search history.

(56) References Cited

U.S. PATENT DOCUMENTS

2017/0208491 A1*   7/2017   Xu ........................ H04W 24/10
2022/0345990 A1*   10/2022   Godin ................... H04W 48/02

FOREIGN PATENT DOCUMENTS

WO     2023/059242 A1     4/2023

OTHER PUBLICATIONS

"Revised SID: Study on enhancement for data collection for NR and ENDC", 3GPP TSG RAN Meeting #89e, RP-201620, Agenda: 9.7.13, CMCC, Sep. 14-18, 2020, 4 pages.
"Revised WID: Artificial Intelligence (AI)/Machine Learning (ML) for NG-RAN", 3GPP TSG RAN Meeting #95e, RP-220635, Agenda: 9.3.3.4, CMCC, Mar. 17-23, 2022, 7 pages.
"3rd Generation Partnership Project; Technical Specification Group Radio Access Network; Evolved Universal Terrestrial Radio Access (E-UTRA) and NR; Study on enhancement for Data Collection for NR and EN-DC (Release 17)", 3GPP TR 37.817, V17.0.0, Apr. 2022, pp. 1-23.
"3rd Generation Partnership Project; Technical Specification Group Services and System Aspects; Telecommunication management; Subscriber and equipment trace; Trace control and configuration management (Release 17)", 3GPP TS 32.422, V17.10.0, Mar. 2023, pp. 1-235.

(Continued)

*Primary Examiner* — Idowu O Osifade

(74) *Attorney, Agent, or Firm* — Barta Jones, PLLC

(57) ABSTRACT

Embodiments of the present disclosure relate to devices, methods, apparatuses and computer readable storage media related to minimization of driving test configuration. The method comprises receiving an original MDT configuration, receiving an indication indicating whether all or a part of the original MDT configuration is allowed to be modified, configuring a modified MDT configuration from the original MDT configuration based on the indication, and transmitting the modified MDT configuration.

15 Claims, 9 Drawing Sheets

(56) References Cited

OTHER PUBLICATIONS

"3rd Generation Partnership Project; Technical Specification Group Radio Access Network; NR; Layer 2 Measurements; (Release 17)", 3GPP TS 38.314, V17.2.0, Dec. 2022, pp. 1-31.

"3rd Generation Partnership Project; Technical Specification Group Services and System Aspects; Telecommunication management; Subscriber and equipment trace; Trace concepts and requirements (Release 17)", 3GPP TS 32.421, V17.4.0, Sep. 2022, pp. 1-49.

"3rd Generation Partnership Project; Technical Specification Group Radio Access Network; Radio measurement collection for Minimization of Drive Tests (MDT); Overall description; Stage 2 (Release 17)", 3GPP TS 37.320, V17.3.0, Mar. 2023, pp. 1-38.

"3rd Generation Partnership Project; Technical Specification Group Radio Access Network; Requirements for support of radio resource management (FDD) (Release 17)", 3GPP TS 25.133, V17.0.0, Mar. 2022, pp. 1-410.

"3rd Generation Partnership Project; Technical Specification Group Radio Access Network; Evolved Universal Terrestrial Radio Access (E-UTRA); Requirements for support of radio resource management (Release 18)", 3GPP TS 36.133, V18.2.0, Jun. 2023, 4369 pages.

"3rd Generation Partnership Project; Technical Specification Group Radio Access Network; NR; Requirements for support of radio resource management (Release 18)", 3GPP TS 38.133, V18.2.0, Jun. 2023, 5975 pages.

"3rd Generation Partnership Project; Technical Specification Group Radio Access Network; NR; Physical layer measurements (Release 17)", 3GPP TS 38.215, V17.3.0, Mar. 2023, pp. 1-26.

"3rd Generation Partnership Project; Technical Specification Group Radio Access Network; NR; Physical layer procedures for control (Release 17)", 3GPP TS 38.213, V17.6.0, Jun. 2023, pp. 1-262.

"3rd Generation Partnership Project; Technical Specification Group Services and System Aspects; Management and orchestration; 5G performance measurements (Release 18)", 3GPP TS 28.552, V18.3.0, Jun. 2023, pp. 1-347.

"3rd Generation Partnership Project; Technical Specification Group Radio Access Network; NR; Radio Resource Control (RRC) protocol specification (Release 17)", 3GPP TS 38.331, V17.5.0, Jun. 2023, pp. 1-1328.

International Search Report and Written Opinion received for corresponding Patent Cooperation Treaty Application No. PCT/EP2024/067732, dated Oct. 4, 2024, 15 pages.

"MDT enhancements to support AI/ML based processes", 3GPP TSG-RAN3 Meeting #117-e, R3-224493, Agenda: 12.2, Ericsson, Aug. 15-24, 2022, 5 Pages.

"(TP for AI/ML BLCT to TS38.423 and TS38.413) MDT Enhancements for AI/ML", 3GPP TSG-RAN3 Meeting #117bis-e, R3-225515, Agenda: 12.2.2.1, Ericsson, Oct. 10-18, 2022, 25 Pages.

* cited by examiner

<u>600</u>

610    Receive an original MDT configuration

620    Receive an indication

630    Configure a modified MDT configuration

640    Transmit the modified MDT configuration

<u>700</u>

710    Transmit an original MDT configuration

720    Transmit an indication

<u>800</u>

810   Receive a modified MDT configuration

820   Perform one or more first RRC measurements

830   Transmit the one or more MDT measurement

900

ENABLING A FLEXIBLE MDT CONFIGURATION

FIELD

Embodiments of the present disclosure generally relate to the field of telecommunication and in particular to devices, methods, apparatuses and computer readable storage media for enabling a flexible minimization of driving test, MDT, configuration.

BACKGROUND

The MDT is currently widely used by operators who want a feedback on the coverage on a particular area of their network (i.e., Management-based MDT) or feedback on the radio conditions experienced by some specific UE(s) in a given coverage area of the public land mobile network (PLMN) (i.e., signalling based MDT).

SUMMARY

The scope of protection sought for various example embodiments is set out by the claims. The example embodiments and features, if any, described in this specification that do not fall under the scope of the claims are to be interpreted as examples useful for understanding various embodiments.

In a first aspect, there is provided an apparatus comprising at least one processor; and at least one memory storing instructions that, when executed by the at least one processor, cause a network node at least to perform receiving an original minimization of driving test, MDT, configuration; receiving an indication indicating whether all or a part of the original MDT configuration is allowed to be modified; configuring a modified MDT configuration from the original MDT configuration based on the indication; and transmitting the modified MDT configuration.

In a second aspect, there is provided an apparatus comprising at least one processor; and at least one memory storing instructions that, when executed by the at least one processor, cause a network entity at least to perform: transmitting, to a network node, an original minimization of driving test, MDT, configuration; and transmitting, to the network node, an indication indicating whether all or a part of the original MDT configuration is allowed to be modified

. . . .

In a third aspect, there is provide an apparatus comprising at least one processor; and at least one memory storing instructions that, when executed by the at least one processor, cause a user device at least to perform: receiving, from a network node, a modified minimization of driving test, MDT, configuration, the modified MDT configuration is modified from an original MDT configuration by the network node; performing one or more first MDT measurements according to the modified MDT configuration; and transmitting, to the network node, the one or more first MDT measurements.

In a fourth aspect, there is provided a method comprising: receiving an original minimization of driving test, MDT, configuration; receiving an indication indicating whether all or a part of the original MDT configuration is allowed to be modified; configuring a modified MDT configuration from the original MDT configuration based on the indication; and transmitting the modified MDT configuration.

In a fifth aspect, there is provided a method comprising: transmitting, to a network node, an original minimization of driving test, MDT, configuration; and transmitting, to the network node, an indication indicating whether all or a part of the original MDT configuration is allowed to be modified.

In a sixth aspect, there is provided a method comprising: receiving, from a network node, a modified minimization of driving test, MDT, configuration, the modified MDT configuration is modified from an original MDT configuration by the network node; performing one or more first MDT measurements according to the modified MDT configuration; and transmitting, to the network node, the one or more first MDT measurements.

In a seventh aspect there is provided a non-transitory computer readable medium comprising program instructions which, when executed by an apparatus, cause the apparatus to perform at least the following: receiving an original minimization of driving test, MDT, configuration; receiving an indication indicating whether all or a part of the original MDT configuration is allowed to be modified; configuring a modified MDT configuration from the original MDT configuration based on the indication; and transmitting the modified MDT configuration.

In an eighth aspect, there is provided a non-transitory computer readable medium comprising program instructions which, when executed by an apparatus, cause the apparatus to perform at least the following: transmitting, to a network node, an original minimization of driving test, MDT, configuration; and transmitting, to the network node, an indication indicating whether all or a part of the original MDT configuration is allowed to be modified.

In a ninth aspect, there is provided a non-transitory computer readable medium comprising program instructions which, when executed by an apparatus, cause the apparatus to perform at least the following: receiving, from a network node, a modified minimization of driving test, MDT, configuration, the modified MDT configuration is modified from an original MDT configuration by the network node; performing one or more first MDT measurements according to the modified MDT configuration; and transmitting, to the network node, the one or more first MDT measurements.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings.

Throughout the drawings, the same or similar reference numerals may represent the same or similar element.

DETAILED DESCRIPTION

Figure 1:
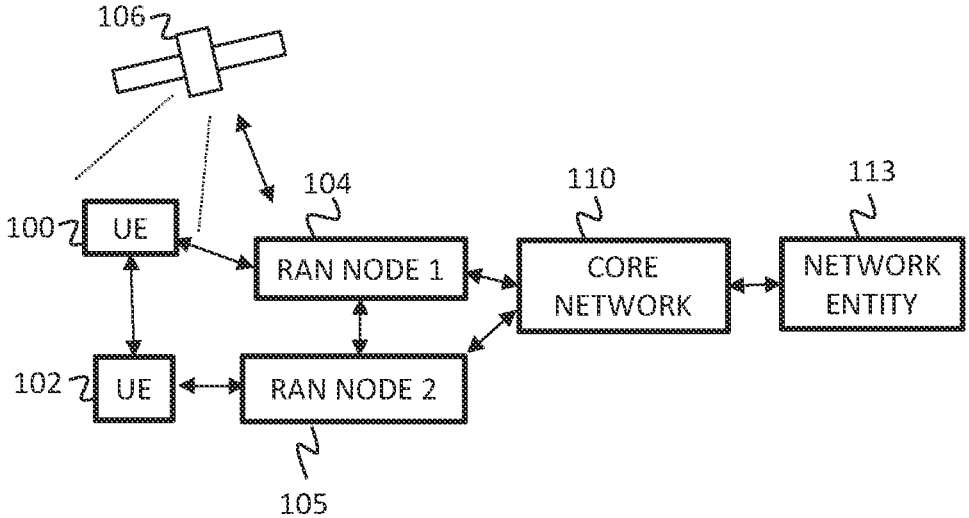
FIG. 1 illustrates an example of a wireless communication network.

The following embodiments are exemplifying. Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein may be implemented in various manners other than the ones described below.

In the following description and claims, unless defined otherwise, all technical and scientific terms used herein may have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, element or characteristic, but it is not necessary that every embodiment includes the particular feature, structure, element or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, element or characteristic in connection with other embodiments whether or not explicitly described.

It shall be understood that although the terms "first," "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75 G, the third generation (3G), the fourth generation (4G), 4.5 G, the fifth generation (5G), the sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a radio access network (RAN) node, a new generation RAN (NG-RAN) node, a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture includes a Centralized Unit (CU) and a Distributed Unit (DU) at an IAB donor node. An IAB node includes a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," "downlink resource" or "sidelink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

FIG. 1 illustrates an example of a simplified wireless communication network showing some physical and logical entities. The connections shown in FIG. 1 may be physical connections or logical connections. It is apparent to a person skilled in the art that the wireless communication network may also comprise other physical and logical entities than those shown in FIG. 1.

The example embodiments described herein are not, however, restricted to the wireless communication network given as an example but a person skilled in the art may apply the embodiments described herein to other wireless communication networks provided with necessary properties.

The example wireless communication network shown in FIG. 1 includes an access network, such as a radio access network (RAN), and a core network 110.

FIG. 1 shows user equipment (UE) 100, 102 configured to be in a wireless connection on one or more communication channels in a radio cell with a radio access network node (RAN node 1, 2) 104, 105 of an access network. The RAN node 104, 105 may be an evolved Node B (abbreviated as eNB or eNodeB) or a next generation Node B (abbreviated as gNB or gNodeB), providing the radio cell. The wireless connection (e.g., radio link) from a UE 100, 102 to the RAN node 104, 105 may be called uplink (UL) or reverse link, and the wireless connection (e.g., radio link) from the RAN node 104, 105 to the UE 100, 102 may be called downlink (DL) or forward link.

A UE 100 may also communicate directly with another UE 102, and vice versa, via a wireless connection generally referred to as a sidelink (SL). It should be appreciated that the RAN node 104, 105 or its functionalities may be implemented by using any node, host, server or access point etc. entity suitable for providing such functionalities.

The access network may comprise more than one RAN node 104, 105, in which case the RAN nodes 104, 105 may also be configured to communicate with one another over links, wired or wireless. These links between RAN nodes 104, 105 may be used, for example, for sending and receiving control plane signaling and also for routing data such as measurements from one RAN node 104 to another RAN node 105.

A RAN node 104, 105 may comprise a computing device configured to control the radio resources of the RAN node. The RAN node may also be referred to as a base station, a base transceiver station (BTS), an access point, an access node, a radio access node, a cell site, or any other type of node capable of being in a wireless connection with a UE (e.g., UEs 100, 102). The RAN node may include or be coupled to transceivers. From the transceivers of the RAN node, a connection may be provided to an antenna unit that establishes bi-directional radio links to UEs 100, 102. The antenna unit may comprise an antenna or antenna element, or a plurality of antennas or antenna elements.

The RAN node 104, 105 may further be connected to a core network (CN) 110. The core network 110 may comprise an evolved packet core (EPC) network and/or a 5th generation core network (5GC). The EPC may comprise network entities, such as a serving gateway (S-GW for routing and forwarding data packets), a packet data network gateway (P-GW) for providing connectivity of UEs to external packet data networks, and a mobility management entity (MME). The 5GC may comprise network functions, such as a user plane function (UPF), an access and mobility management function (AMF), and a location management function (LMF). The core network 110 may comprise a trace collection entity (TCE) and an operations and maintenance entity for supporting the MDT.

The core network 110 may also be able to communicate with one or more external network entities 113, such as a public switched telephone network or the Internet, or utilize services provided by them. For example, in 5G wireless communication networks, the UPF of the core network 110 may be configured to communicate with an external data network via an N6 interface. In LTE wireless communication networks, the P-GW of the core network 110 may be configured to communicate with an external data network.

The illustrated UE 100, 102 is one type of an apparatus to which resources on the air interface may be allocated and assigned. The UE 100, 102 may also be called a wireless communication device, a subscriber unit, a mobile station, a remote terminal, an access terminal, a user terminal, a terminal device, or a user device just to mention but a few names. The UE may be a computing device operating with or without a subscriber identification module (SIM), including, but not limited to, the following types of computing devices: a mobile phone, a smartphone, a personal digital assistant (PDA), a handset, a computing device comprising a wireless modem (e.g., an alarm or measurement device, etc.), a laptop computer, a desktop computer, a tablet, a game console, a notebook, a multimedia device, a reduced capability (RedCap) device, a wearable device (e.g., a watch, earphones or eyeglasses) with radio parts, a sensor comprising a wireless modem, or any computing device comprising a wireless modem integrated in a vehicle.

The wireless communication network may also be able to support the usage of cloud services, for example at least part of core network operations may be carried out as a cloud service. The wireless communication network may also comprise a central control entity, or the like, providing facilities for wireless communication networks of different operators to cooperate for example in spectrum sharing.

5 G/6 G enables using multiple input-multiple output (MIMO) antennas in the RAN node 104, 105 and/or the UE 100, 102, many more RAN nodes than an LTE network (a so-called small cell concept), including macro sites operating in co-operation with smaller stations and employing a variety of radio technologies depending on service needs, use cases and/or spectrum available. 5G wireless communication networks may support a wide range of use cases and related applications including video streaming, augmented reality, different ways of data sharing and various forms of machine type applications, such as (massive) machine-type communications (mMTC), including vehicular safety, different sensors and real-time control.

In 5G wireless communication networks, RAN nodes and/or UEs may have multiple radio interfaces, namely below 6 GHz, cmWave and mmWave, and also being integrable with existing legacy radio access technologies, such as the LTE. Integration with the LTE may be implemented, for example, as a system, where macro coverage may be provided by the LTE, and 5 G radio interface access may come from small cells by aggregation to the LTE. In other words, a 5G wireless communication network may support both inter-RAT operability (such as LTE-5 G) and inter-RI operability (inter-radio interface operability, such as below 6 GHz-cmWave-mmWave). One of the concepts considered to be used in 5G wireless communication networks may be network slicing, in which multiple independent and dedicated virtual sub-networks (network instances) may be created within the substantially same infrastructure to run services that have different requirements on latency, reliability, throughput and mobility.

5 G may enable analytics and knowledge generation to occur at the source of the data. This approach may involve leveraging resources that may not be continuously connected to a network, such as laptops, smartphones, tablets and sensors. Multi-access edge computing (MEC) may provide a distributed computing environment for application and service hosting. It may also have the ability to store and process content in close proximity to cellular subscribers for faster response time. Edge computing may cover a wide range of technologies, such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

In some example embodiments, a RAN node 104, 105 may comprise: a radio unit (RU) comprising a radio transceiver (TRX), i.e., a transmitter (Tx) and a receiver (Rx); one or more distributed units (DUs) that may be used for the so-called Layer 1 (L1) processing and real-time Layer 2 (L2) processing; and a central unit (CU) (also known as a centralized unit) that may be used for non-real-time L2 and Layer 3 (L3) processing. The CU may be connected to the one or more DUs for example via an F1 interface. Such an embodiment of the access node may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU may be a logical node hosting radio resource control (RRC), service data adaptation protocol (SDAP) and/or packet data convergence protocol (PDCP), of the NR protocol stack for an access node. The DU may be a logical node hosting radio link control (RLC), medium access control (MAC) and/or physical (PHY) layers of the NR protocol stack for the access node. The operations of the DU may be at least partly controlled by the CU. It should also be understood that the distribution of functions between DU and CU may vary depending on implementation. The CU may comprise a control plane (CU-CP), which may be a logical node hosting the RRC and the control plane part of the PDCP protocol of the NR protocol stack for the access node. The CU may further comprise a user plane (CU-UP), which may be a logical node hosting the user plane part of the PDCP protocol and the SDAP protocol of the CU for the access node.

Cloud computing systems may also be used to provide the CU and/or DU. A CU provided by a cloud computing system may be referred to as a virtualized CU (vCU). In addition to the vCU, there may also be a virtualized DU (vDU) provided by a cloud computing system. Furthermore, there may also be a combination, where the DU may be implemented on so-called bare metal solutions, for example application-specific integrated circuit (ASIC) or customer-specific standard product (CSSP) system-on-a-chip (SoC).

Edge cloud may be brought into the access network (e.g., RAN) by utilizing network function virtualization (NFV) and software defined networking (SDN). Using edge cloud may mean access node operations to be carried out, at least partly, in a computing system operationally coupled to a remote radio head (RRH) or a radio unit (RU) of an access node. It is also possible that access node operations may be performed on a distributed computing system or a cloud computing system located at the access node. Application of cloud RAN architecture enables RAN real-time functions being carried out at the access network (e.g., in a DU) and non-real-time functions being carried out in a centralized manner (e.g., in a CU).

It should also be understood that the distribution of functions between core network operations and access node operations may differ in future wireless communication networks compared to that of the LTE or 5 G, or even be non-existent. Some other technology advancements that may be used include big data and all-IP, which may change the way wireless communication networks are being constructed and managed. 5 G (or new radio, NR) wireless communication networks may support multiple hierarchies, where multi-access edge computing (MEC) servers may be placed between the core network 110 and the access node 104. It should be appreciated that MEC may be applied in LTE wireless communication networks as well.

A 5G wireless communication network ("5 G network") or a 6G network may also comprise a non-terrestrial communication network, such as a satellite communication network, to enhance or complement the coverage of the 5 G radio access network. For example, satellite communication may support the transfer of data between the 5 G radio access network and the core network, enabling more extensive network coverage. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular megaconstellations (systems in which hundreds of (nano) satellites are deployed). A given satellite 106 in the megaconstellation may cover several satellite-enabled network entities that create on-ground cells. The on-ground cells may be created through an on-ground relay access node or by a RAN node 104, 105 located on-ground or in a satellite.

It is obvious for a person skilled in the art that the RAN nodes 104, 105 depicted in FIG. 1 are just an example of a part of an access network (e.g., a radio access network) and in practice, the access network may comprise more than two RAN nodes, the UEs 100, 102 may have access to a plurality of radio cells, and the access network may also comprise other apparatuses, such as physical layer relay access nodes or other entities. At least one of the access nodes may be a Home eNodeB or a Home gNodeB. A Home gNodeB or a Home eNodeB is a type of access node that may be used to provide indoor coverage inside a home, office, or other indoor environment.

Additionally, in a geographical area of an access network (e.g., a radio access network), a plurality of different kinds of radio cells as well as a plurality of radio cells may be provided. Radio cells may be macro cells (or umbrella cells) which may be large cells having a diameter of up to tens of kilometers, or smaller cells such as micro-, femto- or pico-cells. The RAN nodes 104, 105 of FIG. 1 may provide any kind of these cells. A cellular radio network may be implemented as a multilayer access networks including several kinds of radio cells. In multilayer access networks, one RAN node may provide one kind of a radio cell or radio cells, and thus a plurality of RAN nodes may be needed to provide such a multilayer access network.

For fulfilling the need for improving performance of access networks, the concept of "plug-and-play" RAN nodes may be introduced. An access network which may be able to use "plug-and-play" RAN nodes, may include, in addition to Home eNodeBs or Home gNodeBs, a Home Node B gateway, or HNB-GW (not shown in FIG. 1). An HNB-GW, which may be installed within an operator's access network, may aggregate traffic from a large number of Home eNodeBs or Home gNodeBs back to a core network of the operator.

To meet the 5G network requirements of performance and the demands of the unprecedented growth of the mobile subscribers, millions of RAN nodes (i.e., base stations) are being deployed. Such rapid growth brings the issues of optimizing the network. Artificial intelligence (AI) or machine learning (ML) techniques may be utilized to automate the optimization. For example, AI or ML may be used for the following RAN use cases: network energy saving, load balancing, and/or mobility optimization.

AI/ML based prediction may enable improved performance. For example, prediction of UE trajectory or future location may be useful to adjust handover thresholds, such as the cell individual offset or to select the RAN-based notification area (RNA) in RRC inactive mode. Prediction of UE location may further help network resource allocation for various use cases including energy saving, load balancing and mobility management. As another example, handover decisions may be improved by using prediction information on the UE performance at the target cell. Energy saving decisions taken locally at a cell may be improved by utilizing prediction information on incoming UE traffic, as well as prediction information about traffic that may be offloaded from a candidate energy saving cell to a neighbor cell ensuring coverage. However, the MDT framework was designed for the original purpose of enabling the operator to perform automated coverage verifications. Use of MDT for the purposes described above therefore requires enhancements of the MDT framework.

AI/ML Framework

Figure 2:
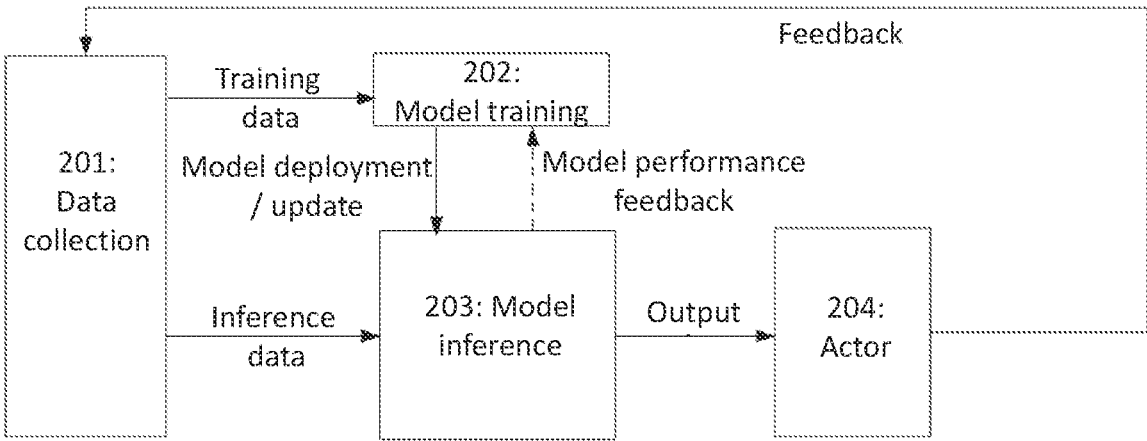
FIG. 2 illustrates a functional framework for radio access network intelligence.

FIG. 2 illustrates the functional framework for RAN intelligence.

Referring to FIG. 2, the data collection function 201 is a function that provides training data to the model training function 202, and inference data to the model inference function 203. AI or ML algorithm specific data preparation (e.g., data pre-processing and cleaning, formatting, and transformation) may or may not be carried out at the data collection function 201.

Some examples of the training data or inference data may include measurements from UEs or different network entities, feedback from the actor 204, and/or output from an AI or ML model.

The training data refers to the data used as input for the AI or ML model training function 202.

The inference data refers to the data used as input for the AI or ML model inference function 203.

The model training function 202 is a function that performs the AI or ML model training, validation, and testing which may generate model performance metrics as part of the model testing procedure. The model training function 202 may also be responsible for data preparation (e.g., data pre-processing and cleaning, formatting, and transformation) based on the training data delivered by the data collection function 201, if required.

Model deployment or update may be used to initially deploy a trained, validated, and tested AI or ML model to the model inference function 203 or to deliver an updated model to the model inference function 203.

The model inference function 203 is a function that provides AI or ML model inference output (e.g., predictions or decisions). The model inference function 203 may provide model performance feedback to the model training function 202, when applicable. The model inference function 203 may also be responsible for data preparation (e.g., data pre-processing and cleaning, formatting, and transformation) based on the inference data delivered by the data collection function 201, if required. The inference output of the AI or ML model is produced as the output of the model inference function 203. The inference output may be used case specific. Model performance feedback from the model inference function 203 may be used for monitoring the performance of the AI or ML model, when available.

The actor 204 is a function that receives the output from the model inference function 203 and triggers or performs corresponding actions. The actor 204 may trigger actions directed to other entities or to itself.

The actor 204 may provide feedback information that may be used to derive the training data, the inference data or to monitor the performance of the AI or ML model and its impact to the network through updating of key performance indicators (KPIs) and performance counters.

The entities illustrated in FIG. 2 may be configured at a single network entity such as the gNB 104, the core network 110 or the network entity 113. In some exemplary embodiments, some of each of the entities illustrated in FIG. 2 may be configured at the different entities explained in FIG. 1.

For example, based on the location of the model training function 202 and the model inference function 203, at least the following two options are possible. In the first option, the model training function 202 may be located in the operations, administration, and maintenance (OAM) functions, and the model inference function 203 may be located in a RAN node 104, 105 (e.g., gNB, gNB-CU or gNB-DU in case of split architecture). In the second option, the model training function 202 and the model inference function 203 may both be located in a RAN node 104, 105 (e.g., gNB, gNB-CU, or gNB-DU in case of split architecture). For example, the OAM functions may be located in the core network 110 or in a centralized management system.

RAN is a distributed architecture. RAN nodes (e.g., gNBs) may be able to execute different ML models at different points in time. This implies that the availability of certain predictions is dependent on the trained models available at a given RAN node. Even though different RAN nodes may have different ML models available, it is possible that network conditions change and one or more of these models requires retraining. During the retraining, the RAN node is not able to provide predictions corresponding to this ML model to its neighboring RAN nodes. As another example, unavailability of a prediction may also be due to overload experienced by the RAN node, which makes it incapable to calculate a predicted value.

In some cases, the RAN node requesting predictions may be interested in receiving those predictions only if all the requested predictions can be provided. This may be the case, if, for example, all of the requested predictions need to be provided as input to an ML model present at the RAN node receiving the predictions (e.g., for model training or for model inference purposes).

However, in some other scenarios, it may not be necessary for all the requested measurements to be received. This could be the case, if, for example, a RAN node only requests a prediction (e.g., related to a predicted load) to monitor the behavior of a neighboring RAN node.

In addition, AI or ML functions may also require a source node to request, from a neighboring RAN node, UE performance feedback related to UEs being handed over from the source node to the target node in order to evaluate the handover behavior and performance. Several types of UE performance feedback may be requested, including (but not limited to): uplink and downlink throughput, packet delay, packet error rate, quality of experience (QoE) performance, to name a few.

In some cases, UE performance feedback may not be a necessary type of feedback for an AI or ML algorithm. In some other cases, a source node may need to obtain at least one type of UE performance information to fine-tune its ML algorithm. Other algorithms may require more than one type of UE performance feedback. This requirement may involve certain UEs or certain UE categories or certain types of handovers (e.g., related to certain AI or ML use cases). For example, it is possible that for one AI or ML algorithm only the throughput UE performance feedback is needed, while for some other both the throughput and delay UE performance feedback may be necessary for performance monitoring.

Besides predictions and UE performance feedback after a handover, neighbor node measurements may be needed by a RAN node to train or execute an AI or ML model. When the RAN node requests those measurements (e.g., measurements related to load values), it may need to successfully receive all the requested values. This may be the case, for example, when the RAN node needs to execute model inference using those measurements as the input. This may also be the case, when the RAN node needs to use the information as part of the ground truth related to a prediction to evaluate the accuracy of a prediction obtained by a neighboring RAN node. If, for example, a neighboring RAN node provided a prediction at a certain point in time (e.g., a predicted load at time t), then the RAN node may need to receive the ground truth corresponding to this prediction at the same point in time (e.g., actual load at time t), when the prediction was made.

Executing AI or ML algorithms may increase the processing load of a RAN node. Therefore, the RAN node may sometimes need to prioritize among the measurements or prediction requests received from its neighboring RAN nodes, in case it is not able to satisfy them all. If, for example, the RAN node receives two requests from two different neighboring RAN nodes, but it can only serve one of them, it may be beneficial if the RAN node is provided with assistance information on the priority of the request to help it determine which of the two neighboring RAN nodes to serve.

In TR 37.817, two solutions have been described for each of the 3 prioritized use cases. In one solution, Model Training is in the OAM and Model Inference is in the gNB (gNB-CU in case of split architecture). In the other solution, both Model Training and Model Inference are in the gNB (gNB-CU in case of split architecture). In those solutions, it is also possible that a gNB may continue model training based on AI/ML model trained in the OAM. In some solutions, it is also possible that training takes place in gNB-DU. If existing UE measurements are needed by a gNB for AI/ML-based mobility optimization/load balancing/energy saving or for other use cases, 3GPP specifications may reuse the existing framework (including MDT and RRM measurements).

MDT Overview

The MDT (Minimization of Drive Tests) feature is currently a feature widely used by operators who want a feedback on the coverage on a particular area of their network (Management-based MDT) or feedback on the radio conditions experienced by some specific UE(s) in a given coverage area of the PLMN (signalling based MDT). There are two types of MDT, such as a Logged MDT and an Immediate MDT.

The Logged MDT applies for RRC_IDLE and RRC_INACTIVE modes. For Logged MDT, the UE, when it is in RRC_connected, receives a Logged MDT configuration from the network. The Logged MDT configuration is stored in the UE. The configured Logged MDT measurements are performed when the UE is in RRC_idle/RRC_Inactive state during the configured logging duration (e.g., max. 2 hours in current specification), and measurement results are buffered in the UE. When the UE reconnects, the availability of buffered measurements is signalled to the network which may retrieve the log and forward to OAM (or, Trace Collection Entity—TCE). In RRC_connected mode, the Logged MDT configuration is simply kept but the measurements are not performed. However, the network may be configured with Immediate MDT configuration. The latter may result the UE to be configured with RRC measurements, however the UE is not aware whether the purpose of these RRC measurements is the RRM or MDT.

The RAN node (e.g., 104, 105) may receive MDT configurations (Logged MDT, Immediate MDT) directly from the OAM (e.g., 113), in which case the RAN node itself selects the UEs (e.g., 100, 102) to be configured. This is called management-based MDT. For management-based MDT, the OAM provides a TR (Trace Reference) as an identifier, while the RAN node allocates a TRSR (Trace Recording Session Reference) per selected UE.

The RAN node may also receive MDT configurations (Logged MDT, Immediate MDT) from the Core Network (e.g., 110) via UE-associated signalling. This case is called signalling-based MDT, and targets a specific UE.

For Logged MDT measurements, in "camped normally" state, a UE shall perform logging as per the logged measurement configuration. This state includes a period between cell selection criteria not being met and UE entering "any cell selection" state. For example, 12s for Universal Terrestrial Radio Access (UTRA, see TS 25.133), 10s for Enhanced-UTRA (E-UTRA, see TS 36.133), or 10s for New Radio (NR, see TS 38.133).

In "any cell selection" state, a UE shall perform logging of available information (i.e. at least indicator 'anyCellSelectionDetected', time stamp, and the available location information). In "camped on any cell" state, the periodic logging stops. However, it should be noted that the duration timer is kept running. When the UE re-enters "camped normally" state and the duration timer has not expired, the periodic logging is restarted based on new DRX and logging resumes automatically (with a leap in time stamp).

The measurement quantities for downlink pilot strength measurement logging are fixed and consist of both Reference Signal Received Power (RSRP) and Reference Signal Received Quality (RSRQ) for EUTRA, both received Signal Code Power (RSCP) and Ec/No for UTRA FDD, Primary Common Control Physical Channel (P-CCPCH) RSCP for UTRA 1.28 Mcps TDD, Rxlev for GERAN, and Pilot Pn Phase and Pilot Strength for CDMA2000 if the serving cell is EUTRAN cell, and both RSRP and RSRQ for NR.

For NR, in addition to the logged measurement quantities of the camped cell, the best beam index (SSB Index) as along with the best beam RSRP/RSRQ are logged as well as the 'number of good beams' (the number of SSBs that are above the configured threshold i.e., absThreshSS-Blocks-Consolidation, if configured by the network) associated to the cells within the R value range (which is configured by network for cell reselection) of the highest ranked cell as part of the beam level measurements. Sensor measurements are logged if available.

Regarding the Immediate MDT measurements, one or some of the following measurements may be used.

M1: DL signal quantities measurement results for the serving cell and for intra-frequency/Inter-frequency/inter-RAT neighbour cells, including cell/beam level measurement for NR cells only, TS 38.215

M2: Power Headroom measurement by UE, TS 38.213

M4: PDCP SDU Data Volume measurement separately for DL and UL, per DRB per UE, see TS 28.552

M5: Average UE throughput measurement separately for DL and UL, per DRB per UE and per UE for the DL, per DRB per UE and per UE for the UL, by gNB, see TS 28.552

M6: Packet Delay measurement separately for DL and UL, per DRB per UE, TS 28.552 and TS 38.314

Note: UL PDCP Excess Packet Delay measurement can be configured with a threshold as specified in TS 38.331

M7: Packet loss rate measurement separately for DL and UL, per DRB per UE, TS 28.552 and TS 38.314

M8: RSSI measurement by UE (for WLAN/Bluetooth measurement) see TS 38.331

M9: RTT Measurement by UE (for WLAN measurement) see TS 38.331

Management Based MDT Activation Mechanism

For management-based MDT data collection with no international mobile subscriber identity (IMSI)/international mobile equipment identify (IMEI)/subscription permanent identifier (SUPI) criteria in the case of non-split architecture, the UE selection can be done in the radio network at gNB based on the input information received from management system and the user consent information stored in the gNB. This mechanism works for the OAM input parameter, such as area information.

Figure 3:
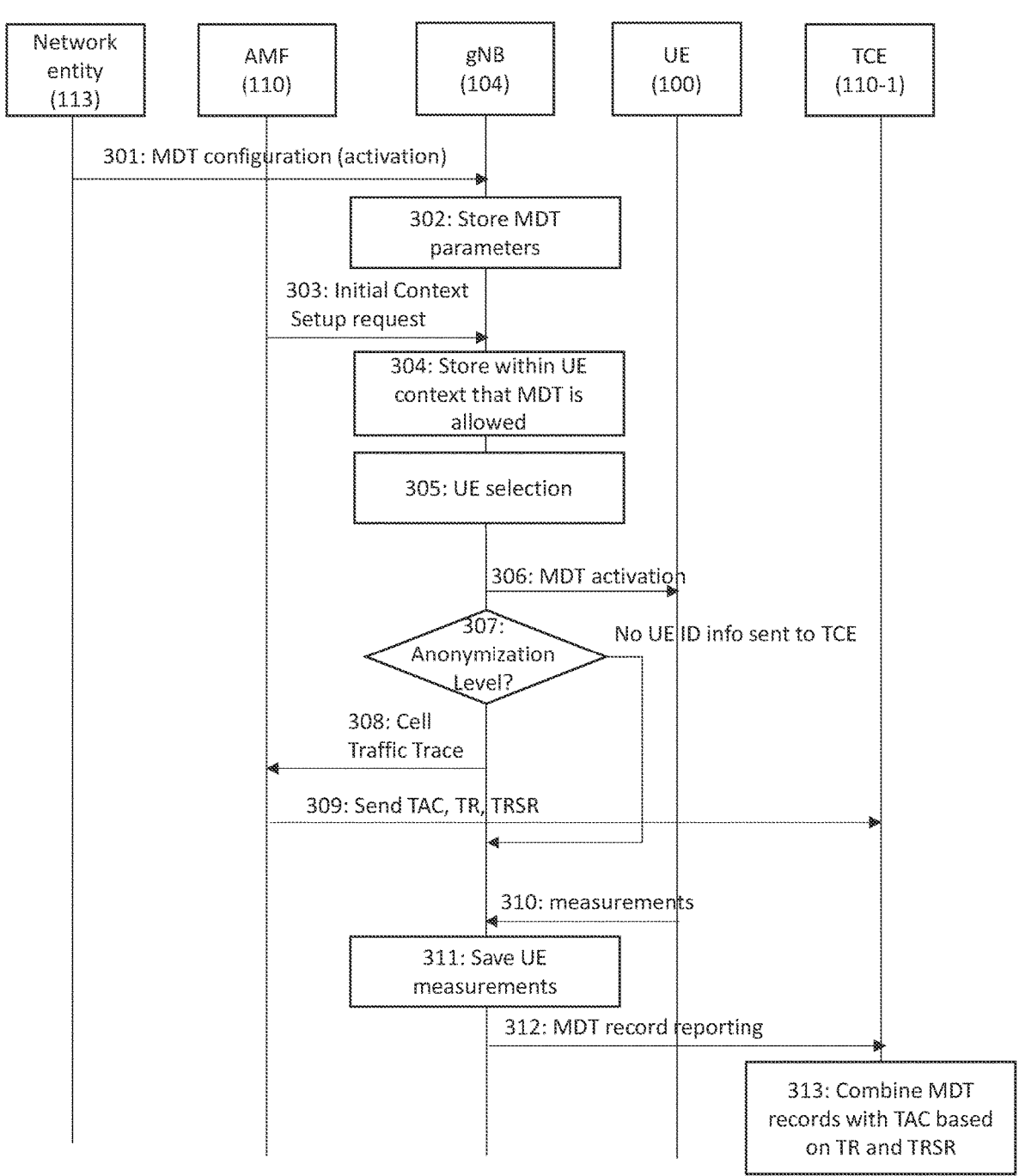
FIG. 3 illustrates an example of management-based MDT activation in the RAN node.

FIG. 3 illustrates an example of management based MDT activation in the RAN node. In addition, FIG. 3 shows how the MDT configuration is done utilizing the cell traffic trace functionality.

At 301, the management system 113 (e.g., network entity, OAM) sends a Trace Session activation request message to the gNB 104. The trace session activation request message (e.g., MDT Activation message) includes MDT configuration information including parameters for configuring MDT measurements.

At 302, the gNB 104 stores the MDT configuration parameters in a non-UE associated context. The management system 113 validates that if a Mobile Country Code (MCC) and a Mobile Network Code (MNC) specified in the trace reference are the same as the PLMN supported by all the cells specified in the area scope. If the gNB 104 receives a trace session activation request with a PLMN in the Trace Reference that does not match any PLMN in its list, the gNB 104 may ignore the request.

At 303, the gNB 103 receives the management-based MDT allowed IE in the Initial Context Setup Request or in Handover request message from the AMF (110). The management-based MDT allowed IE includes management based MDT PLMN list.

At 304, one or more UEs 100 connect to the gNB 104. In this case, the gNB may store within a UE context that the management-based MDT is allowed.

At 305, gNB 104 selects suitable UEs for MDT data collection. For example, the gNB may select the suitable UEs for MDT data collection. The selection may be performed based on i) the area information via an MDT configuration received from the management system 113, ii) the area where the UE 100 is located, and iii) user consent information received from the core network (e.g., AMF) 110 as part of the Management based MDT PLMN List IE. The UE consent information indicates whether the user consents (or agrees) to provide the MDT measurements to the OAM.

At 305, if the UE 100 is not in the specified area or if the Management based MDT PLMN List IE is not present in the UE context, the UE may not be selected by the gNB for MDT data collection. During the UE selection at 305, the gNB may take into account also the UE capability (e.g., MDT capability) when the gNB selects UE for Logged MDT configuration. The gNB 104 may obtain the UE capability information including the MDT capability information when the UE performs the registration procedure to the gNB. If the UE does not support Logged MDT, the UE shall not be selected by the gNB for Logged MDT reporting. If M4 or M5 measurements (e.g., PDCP SDU data volume measurements or average UE throughput measurements) are requested in the MDT configuration, the gNB 104 may start the measurement according to the received MDT configuration.

At 306, the gNB may activate the MDT functionality to the selected UEs by sending an MDT activation message.

If the MDT activation in 301 is for the Logged MDT, the Logged MDT configuration information is sent to the selected UE(s) from the gNB 104. When the gNB activate the MDT functionality, the gNB assign a Trace Recording Session Reference (TRSR) corresponding to the selected UE(s). The Logged MDT trace session is preserved in the UE until the duration time of the trace session expires. The duration time may include multiple idle or inactive periods interrupted by various RRC state transitions such as idle-connected-idle state transitions.

After the MDT activation is initiated, the UE collects MDT measurements and logs according to corresponding MDT configurations until its memory reserved for MDT is full. If the memory reserved for the MDT is full, the UE stops logging, stops the log duration timer, and starts the 48 hour timer.

If the MDT activation in step 301 is for Immediate MDT measurement and the MDT activation message (e.g., the Trace Session activation request message) includes information related to measurements performed by the UE, the corresponding MDT measurements are configured towards the UE. The MDT measurements corresponding to Immediate MDT measurement configuration are deleted in the UE together with the RRC context when the UE enters an RRC idle or inactive mode.

When the selected UEs receive the MDT activation message at 306, the UEs may start the MDT functionality based on the received MDT configuration parameters.

At 307, the gNB 104 may analyse the configured anonymization level regarding the MDT data. Depending on the configured anonymization level, the gNB may trigger Cell Traffic Trace procedure per selected UEs towards the AMF.

At 308, if the MDT anonymization requires the IMEI-TAC (Type Allocation Code) in the MDT record, the gNB 104 shall send the Trace Recording Session Reference, Trace Reference, serving cell CGI, and TCE IP Address in the CELL TRAFFIC TRACE message to the AMF 110 via UE-associated signalling. In this case, a privacy indicator may be included In the Cell Traffic Trace message. The privacy indicator indicates the Logged MDT or the immediate MDT depending on the configured Job type parameter. When AMF 110 receives this NG signalling message containing the Trace Recording Session Reference, Trace Reference, serving cell CGI, and the Privacy Indicator, if so indicated in the privacy indicator, the AMF 110 may look up the subscriber identities (IMEI (SV)) of the given call from its database, and the AMF 110 sends the IMEI-TAC together with the Trace Recording Session Reference and the Trace Reference to the TCE 110-1, at 309. For Immediate MDT, the AMF 110 also transmits the serving cell CGI to the TCE 110-1. For Logged MDT, AMF will send the IMEI-TAC together with the Trace Recording Session Reference, Trace Reference to the TCE. In this case, the TCE 110-1 may be a part of the management system (e.g., the OAM or the network data analytics function (NWDAF)).

For Immediate MDT, at 310 and 311, when the gNB receives at least one measurement from the UE in the RRC message, then the gNB may store the at least one measurement together with the UE's serving cell CGI in the trace record.

For Logged MDT, a UE 100 configured to perform the Logged MDT measurements in RRC_IDLE or RRC_INACTIVE indicates the availability of MDT measurements, by means of a one-bit indicator, in the RRC Setup Complete message during connection establishment. The gNB 104 can decide to retrieve the logged measurements based on this indication by sending a UE Information Request message to the UE 100. The UE 100 can answer with the collected MDT logs in a UE Information Response message at 310.

At 310, the gNB 104 shall not retrieve an MDT report from the UE 100 if UE's Registered PLMN (RPLMN) does not match the PLMN where the TCE 110-1 used to collect MDT data resides. When the gNB receives the MDT report from UE, the gNB may get the Trace Recording Session Reference, Trace Reference and TCE Id from the MDT report, and compare the Trace PLMN (PLMN portion of Trace Reference) with the PLMN where the TCE used to collect MDT data resides, store the MDT report in the gNB 104 at 311 in case of matching PLMN or discard the MDT report in case of a mismatch.

Logged measurement configurations and logs are maintained when UE 100 is in any state of a radio access technology (RAT) even if there exist multiple periods of interruptions when the UE is in a different RAT. There exists a single logged measurement configuration for the Logged MDT in the UE for a RAT. When network provides a measurement configuration (e.g., MDT configuration), previously configured logged measurement configurations will be replaced by the new one. Logged measurements corresponding to previous configuration will be cleared also. Network entity 113 should be able to retrieve data before it is deleted (e.g., when a new configuration is given to the UE).

At 312, the gNB may forward at least one Trace Record to the Trace Collection Entity (TCE). In case of Logged MDT, the TCE Id is indicated in the MDT report is translated to the actual IP address of the TCE by the gNB before it forwards the measurement MDT records. The address translation is based on mapping configured in the gNB. In case of Immediate MDT, the IP address of the TCE is indicated for the gNB in the trace configuration.

At 313, the TCE 110-1 combines the MDT recodes with TAC based on the trace reference and the TRSR. That is, a correlation of MDT measurements is obtained via the logged and Immediate MDT record is possible to some extent.

Flexible MDT Configuration

The MDT configuration comes from the network entity (e.g., OAM or NWDAF) to a RAN node (e.g., gNB), and the RAN node configures with the same measurement configuration provided by the network entity to a UE (identified by its IMSI/SUPI in case of signalling based methods) or a number of UEs (chosen by the gNB in case of management-based methods). However, in the current network system, the RAN node cannot modify the measurement configuration provided by the network entity. The measurement configuration is characterized by the Trace Reference provided by the network entity (e.g., OAM) and the performed measurements therefore need to match the configuration provided by the network entity. Even though MDT measurements are configured by the management system, the collected MDT data received by a RAN node (e.g., a RAN node) may be used by the node as well. Namely the Logged MDT reports or the Immediate MDT measurements reported by a UE may be used also by a RAN node.

However, in some cases a RAN node may need to update the measurement configuration provided by OAM. One reason could be if a RAN node needs to train an AI/ML Model or to execute AI/ML Model Inference that need a different measurement configuration for the data collection. This is possible since OAM may not know the exact details of a particular AI/ML Model Training needs at a RAN node with respect to input data/measurements, or with respect to the optimal data collection configuration pertaining to e.g., periodicity, amount of data, logging interval, etc.

Even though the OAM may deploy AI/ML Models to the RAN node, the latter may need to subsequently retrain the AL/ML model to fit its own environment. Furthermore, if training is in the RAN node, the latter may further monitor performance of the ML Model which may mean that the RAN node may find it necessary to update the configured measurements to better monitor performance.

As an example, if performance e.g., with respect to throughput, delay, packet error rate at a certain cell or SSB beam is decreased the RAN node may need to collect further measurements over a (problematic) area of interest. As another example, a RAN node is hosting an AI/ML Model predicting UE trajectory the RAN node may need to configure additional measurements if it determines that an accuracy or a confidence in the predicted trajectory is too low or below a threshold.

Therefore, it is possible that the data collection needs at a RAN node may not match the MDT configuration from the OAM. Furthermore, the OAM should be enabled to determine if a RAN node has different training and data collection needs and the corresponding preferred configuration to be used by the RAN node, since this can help the OAM later on to determine possible issues with the AI/ML Model in use at the RAN node. Additionally, it can help the OAM optimize MDT Configurations towards a RAN node based on the received alternative configuration chosen by the RAN node (i.e., the base station).

Therefore, a RAN node 104 may need to choose or configure a different MDT configuration towards each or some of UEs in its cells from the original MDT configuration that has been configured by the network entity 113. For example, the contents of the original MDT configuration can be modified by:

different logging interval, different logging duration and/or to a different set of cells in case of Logged MDT, or different set of measurements, reporting triggers, and/or reporting intervals, etc. in case of Immediate MDT.

Hereinafter, some example embodiments may provide flexible MDT configuration. For example, OAM 113 sends an MDT configuration (i.e., an original MDT configuration) including the trace activation with the MDT configuration to the RAN node with an indication that a RAN node can further update the final configuration provided to the UE (for measurements performed by the UE) or applied to the RAN node itself (for measurement performed by the network). In the MDT configuration, it can further be indicated which part of the MDT configuration is modifiable.

These modifiable parts may be provided or indicated through the original MDT configuration that is transmitted from the OAM 113 to the gNB 104 through:

additional measurements to a UE 100 for a Logged MDT or an Immediate MDT. Those measurements may be provided through an unrestricted or restricted list.

Those measurements indicate that the UE may choose to log or report measurements that are not in the original MDT Configuration by the management system;

removal of measurements. Those measurements may be provided through an unrestricted or restricted list. This indication means that a UE may report less measurements than what is indicated in the original MDT Configuration from the management system.

updates in the MDT Reporting configuration so that a RAN node 104 may change the periodicity configuration for a specific UE, as one example;

updates in the MDT Reporting configuration so that a RAN node 104 may change the event triggering the measurement, as one example.

In some embodiments, the modifiable parts may be indicated separately from the original MDT configuration.

A RAN node (i.e., the gNB) 104 may receive an MDT configuration from the OAM 113 with an indication that the MDT configuration can be modified. Then, the RAN node 104 may send a different MDT configuration (i.e., modified MDT configuration) according to the allowed modifications to the UE, or similarly modify MDT measurements performed by the network. When the RAN node 104 applies a modified MDT configuration (identified by TR/TRSR), the modified MDT configuration may be also provided to the TCE 110-1.

In some embodiments, OAM 113 may additionally indicate in the original MDT configuration that the OAM wishes to receive from the RAN node 104 also the measurements according to the original measurement configuration. In this case, the gNB 104 may transmit both the original MDT configuration and the modified MDT configuration to at least one UE.

In some embodiments, OAM 113 may configure a RAN node 104 with a flexible MDT configuration in that it may be subsequently updated by the RAN node before it configures a UE (signalling-based MDT) or a group of UEs (management-based MDT). The allowed updates in the parts that may be modified in the MDT configuration may be restricted or unrestricted. To enable OAM to learn the modified configuration used by the RAN node in the data collection, the modified configuration is sent to TCE 110-1. The modified configuration may be indicated by the RAN node 104 (e.g., gNB) to the management system (e.g., network entity, OAM 113) by indicating the set of measurements that the RAN node requested the UE to perform, the updates in the MDT reporting configuration and the new TRSR assigned by the RAN node to the configuration. In the embodiments, the TCE may be a part of the OAM or may be defined as a separate network entity.

Figure 4:
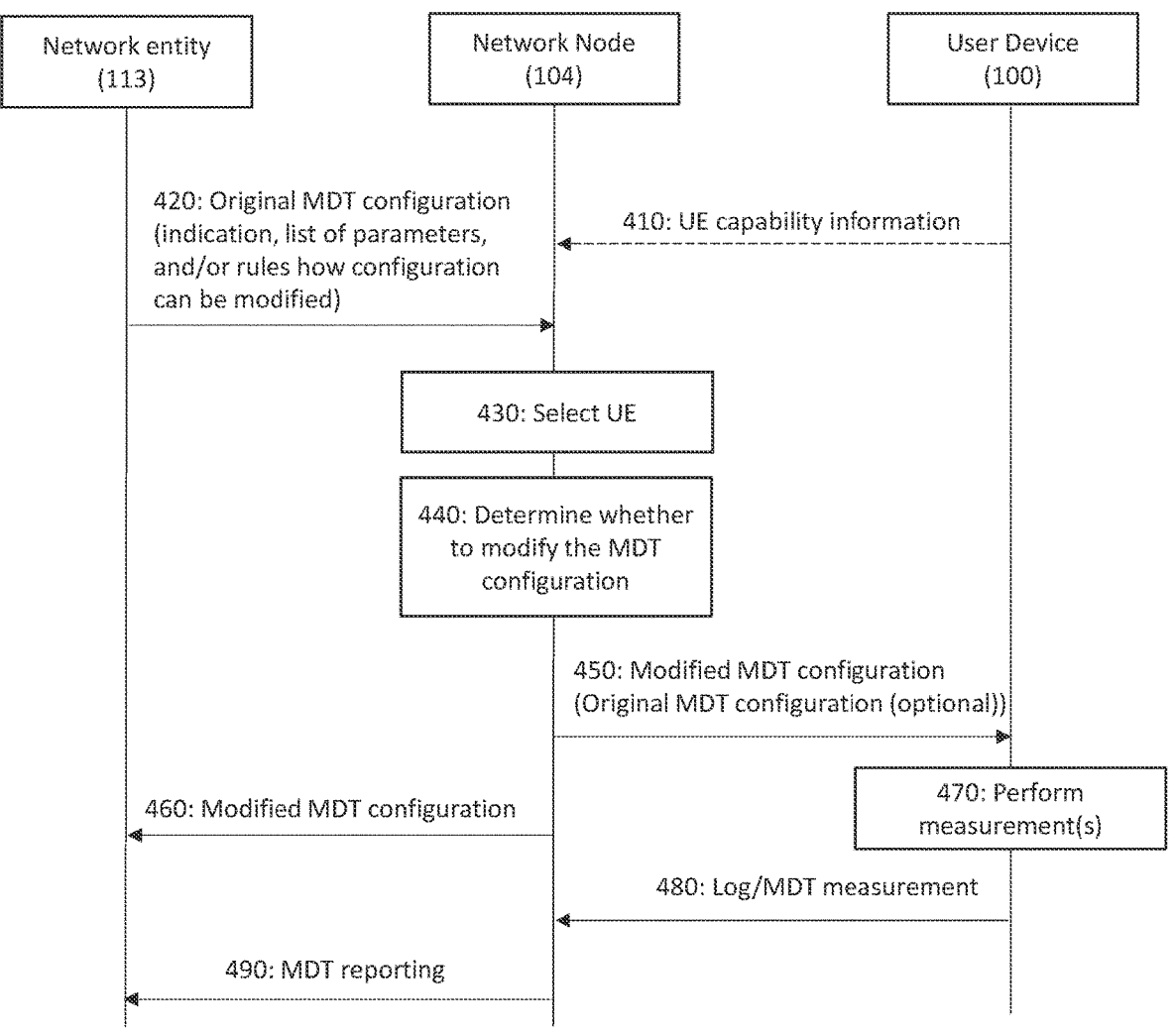
FIG. 4 illustrates an MDT configuration process according to one of example embodiments.

FIG. 4 illustrates an MDT configuration process according to one of example embodiments.

In FIG. 4, only one user device is drawn but there may be more than two user devices according to embodiments. The network entity 113 may be an operation and maintenance (OAM) node or a network data analytics function (NWDAF). If the network entity is the OAM, the OAM may comprise TCE or the TCE may be configured separately from the OAM as an independent entity.

Referring to FIG. 4, at 410, one or more user devices 110 may transmit UE capability information to a Network node 104 (e.g., gNB). The UE capability information may depend on whether the user device is training or executing an AI/ML model. The UE capability information may also depend on UE resources in terms of available memory and power status. The reported UE capability to the network node 104 may be used by the network node 104 to determine whether to configure flexible MDT towards the user device 100, if it has received a flexible MDT Configuration from the network entity 113. For example, a network node 104 may prioritize and configure flexible MDT Configuration towards one or more user devices 104 that have reported to have an AI/ML capability. The block 410 may be an optional regarding the flexible MDT configuration.

When the network entity 113 wish to collect the MDT data, then the network entity generates and configures an original MDT configuration, at 420. Then, the network entity transmits an original MDT configuration to a network node 104. In the embodiments, the original MDT configuration may be called an initial MDT configuration or a first MDT configuration.

At 420, the network entity 113 may transmit an indication to the network node 104. The indication indicates whether all or a part of the original MDT configuration is allowed to be modified. The indication may be transmitted with the original MDT configuration or the indication may be transmitted to the network node 104 by a separate message or an information element. In some aspects, the indication can be configured as a flag.

At 420, when the network entity 113 transmits the indication, the network entity 113 may also transmit at least one of a list of parameters allowed to be modified or at least one rule of how to modify the original MDT configuration, to the network node 104. In this case, the list of parameters indicates one or more parameters of the original MDT configuration.

A plurality of UEs may connect to the network node 104, and the network node may select one or more user devices (UEs) for the MDT data collection, at 430. The selection of the user devices is performed based on the area information received from the network entity 113, location information of the user devices and/or user consent information of the user devices. In addition, if block 410 has been performed, the network node 104 may select one or more user devices further based on the UE capability information.

In some embodiments, the modified MDT configuration may be modified based on the one or more user equipment capability information of the one or more user devices, and the modified MDT configuration is transmitted to the selected at least one of the one or more user devices.

After the network node 104 receives the original MDT configuration, the indication, the list of the parameters can be modified and/or rules how to the original MDT configuration can be modified received at 420, the network node 104 may determine whether to modify the original MDT configuration for the selected one or more user devices, at 440.

If the network node 104 decided to modify the contents of the original MDT configuration, them the network node 104 configures a modified MDT configuration from the original MDT configuration based on at least one of the indications, the list of the parameters, or the rules how to modify the original MDT configuration.

For example, if the indication indicates that the original MDT configuration is allowed to be modified, the network node 104 is able to modify the contents of the original MDT configuration as its own decision (unrestricted mode). If the network node receives the list of the parameters to be modified from the original MDT configuration, then the network node modifies the parameters indicated by the list (restricted mode). If the network node receives the rules indicating how to modify the original MDT configuration, then the network node may modify the original MDT configuration according to one of the indicated rules.

In some embodiments, the modified MDT configuration may be configured for a specific user device or a group of user devices.

Then, at 450, the network node 104 transmits the modified MDT configuration to the one or more selected user devices.

In addition, the network node 104 may also transmit the modified MDT configuration to the network entity 113. In this case, the network entity can be the OAM or the TCE, at 460.

At 470, if the one or more user devices receives the modified MDT configuration, the one or more user devices perform at least one MDT measurement (e.g., Logged MDT measurement and/or Immediate MDT measurement) according to the modified MDT configuration.

At 480, the one or more user devices transmits one or more MDT measurements to the network node 104. In this case, the one or more MDT measurements may include at least one Logged MDT measurement or Immediate MDT measurement that is measured by the one or more user devices at 470.

At 490, the network node 104 configures an MDT report based on the one or more MDT measurements and transmits the MDT report to the network entity 113.

In some embodiments, at 450, the network node 104 may transmit the original MDT configuration to one or more user devices along with the modified MDT configuration. This operation is done by a decision of the network node 104 itself or by a request from the network entity 113 to the network node 104.

If the one or more user devices receives the original MDT configuration and the modified MDT configuration, then the one or more user devices performs MDT measurements according to the original MDT configuration and the modified MDT configuration, at 470.

Then the one or more user devices transmits one or more MDT measurements including at least one Logged MDT measurements or Immediate MDT measurements that have been performed according to the original MDT configuration and the modified MDT configuration.

In some embodiments, at 480 the MDT measurements may be transmitted less frequently than indicated by the modified MDT configuration at 450. In some embodiments, at 480 the MDT measurements may be transmitted more frequently than indicated by the modified MDT configuration at 450.

In some embodiments, the original MDT configuration received at 420 may indicate that MDT measurements are periodically transmitted, while the modified MDT configuration at 450 may indicate that MDT measurements at 480 are transmitted in an event triggered manner.

Figure 5:
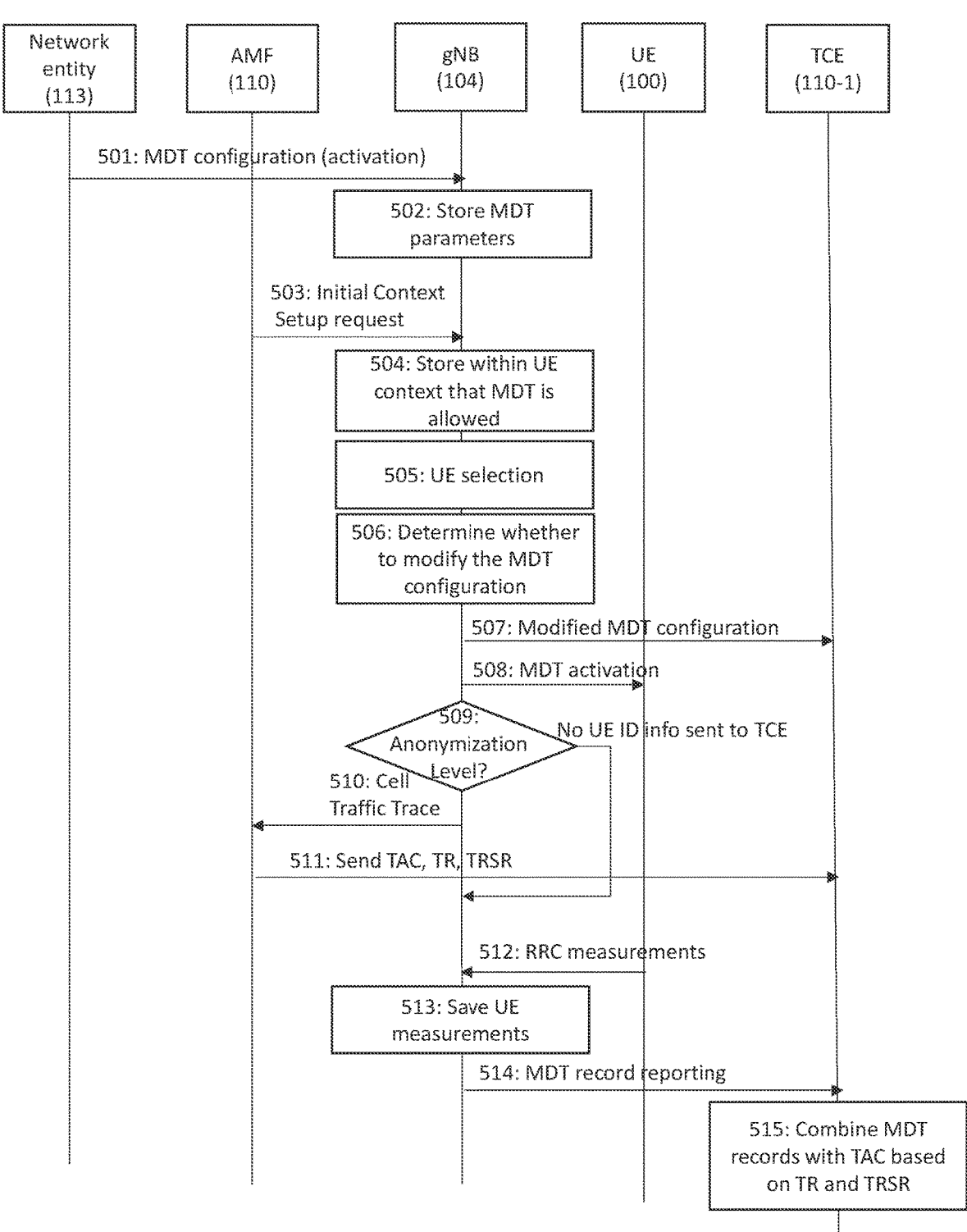
FIG. 5 illustrates an MDT configuration process according to one of example embodiments.

FIG. 5 illustrates an MDT configuration process according to one of example embodiments.

Based on FIG. 5, the MDT configuration process with updates to enable flexible MDT Configuration will be explained. The MDT configuration process illustrated in FIG. 5 is generally the same with the management-based MDT activation process. Thus, only the steps that are different or modified will be explained hereinafter.

At 501, the network entity 113 (hereinafter called, OAM) sends a Trace Session activation request message (e.g., MDT activation message) to RAN node 104 (hereinafter called, gNB) with a Job Type indicating that MDT data needs to be collected. For example, the Job type field indicating one of 'Logged MDT', 'Immediate MDT', 'Trace (logged)+Immediate MDT' Configuration. If other types of MDT configurations are possible (e.g., MBS MDT), those could also be indicated by different Job Type values. The trace session activation request message (e.g., MDT Activation message) includes an original MDT configuration information including parameters for configuring MDT measurements.

OAM 113 includes an original MDT configuration information at 501 to the trace session activation request message and transmits it to the gNB 104. To enable flexibility in the subsequent MDT Configuration that is configured to a user device 100 (hereinafter called UE), OAM 113 may additionally include an indication to signal whether the original MDT Configuration updates are allowed or not. If updates are allowed, the original MDT Configuration by the OAM is flexible meaning that the gNB may update the original MDT configuration based on its needs.

This can be indicated by a flag (i.e., an indication). For example, MDT Configuration updates may be allowed/not allowed, so that when flag is set (e.g., taking a value 1 or a Boolean value "true") the gNB is allowed to update the original MDT Configuration before it configures one or more UEs with it. While if the flag is not set (e.g., taking a value 0 or a Boolean value "false"), the original MDT Configuration is not allowed to change.

If updates (i.e., modification) of the original MDT configuration are allowed, there are restricted or unrestricted type of modifications. In the unrestricted case, gNB 104 may update the original MDT configuration based on its need without any control from OAM 113. In the restricted case, OAM 113 may further provide guidance as to what kind of updates to the original MDT Configuration are allowed. This guidance may be provided in a form of the measurements which can be updated (through addition or deletion), reporting configuration updates e.g., by providing a set of possible alternative periodicities, logging intervals, measurement collection periods or reporting trigger events, etc. That is to say, OAM 113 transmits a list of parameters indicating parameters that could be modified may comprise the following:

---

List of Measurements
Reporting Trigger
Report Interval
Report Amount
Event Threshold
Logging Interval
Logging Duration
Collection Period for RRM Measurements NR (present only if any of M4 or M5 measurements are requested)
Collection Period M6 in NR (present only if any of M6 measurements (DL or UL) is requested)
Collection Period M7 in NR (present only if any of M7 measurements (DL or UL)is requested)
Positioning Method
Report Type for Logged MDT (periodical logged or event-triggered measurement) for Logged MDT only
Event Threshold, Hysteresis and Time to Trigger (present only if L1 event is configured for Logged MDT)
Event List for Event Triggered Measurement for Logged MDT only
Area Configuration for Neighbouring Cells for Logged MDT only
Sensor Information for Logged MDT and Immediate MDT
Excess packet delay thresholds (present only if M6 measurements are requested)

---

If the OAM controls the modification of the original MDT configuration, the OAM lists up the parameters that are allowed to be modified and transmits the list to the gNB.

At 502, the gNB 104 stores the original MDT configuration parameters in a non-UE associated context. The management system 113 validates that if a Mobile Country Code (MCC) and a Mobile Network Code (MNC) specified in the trace reference are the same as the PLMN supported by all the cells specified in the area scope. If the gNB 104 receives a trace session activation request with a PLMN in the Trace Reference that does not match any PLMN in its list, gNB 104 may ignore the request at 501.

At 503, gNB 104 receives an Initial Context Setup Request or in Handover request message including a management based MDT allowed IE from the AMF (110). The management based MDT allowed IE includes a management based MDT PLMN list. In some embodiments, if the gNB 104 is part of a Standalone Non-Public Network (SNPN), management based MDT is performed independently of reception of list of allowed SNPNs.

Assuming the case when one or more UEs 100 connects to the gNB 104. At 504, the gNB may store within a UE context that the management based MDT is allowed based on the management based MDT PLMN list and whether the flexible MDT modification is allowed or not.

In addition, the gNB determines that the original MDT Configuration for the one or more UEs is flexible or not. The gNB can further determine that it needs to update the original MDT configuration for at least one UE based on current data needs at the gNB, for example, related to training locally an ML Model.

At 505, gNB 104 selects suitable UEs for MDT data collection. For example, the gNB may select the suitable UEs for MDT data collection. The selection may be performed based on at least one of i) the area information via the original MDT configuration, ii) the area where the one or more UEs 100 are located, iii) user consent information received from the core network (e.g., AMF) 110 as part of the management-based MDT PLMN List IE, or iv) based on the reported UE capability. The UE consent information indicates whether the user consents (or agrees) to provide the MDT measurements to the OAM.

At 506, gNB 104 determines whether it will use the MDT configuration provided by the OAM or whether it needs to modify it. For example, if the gNB wishes to collect UE measurements to train an AI/ML Model locally available at the gNB, the gNB may modify the related contents of the original MDT configuration.

The gNB will follow the limits in the Flexible Configuration if those are provided by OAM (restricted case). For the restricted case, the OAM may transmit the list of parameter and/or information related to rules indicating how to modify the original MDT configurations along with the original MDT configuration to the gNB at block 501.

If no limits are provided by the OAM, the gNB is allowed to modify the MDT Configuration provided by the OAM without constraints (unrestricted case). For the unrestricted case, the OAM may transmit the indication (i.e., the flag) along with the original MDT configuration to the gNB at block 501 without the list and the information regarding the rules.

At 507, if gNB 104 determines to use the flexible MDT configuration (i.e., modified MDT configuration) by modifying the original MDT configuration received from the OAM, the gNB needs to forward the updated MDT configuration to TCE 110-1. The modified MDT Configuration needs to be sent only once per each of the selected one or more UEs.

At 508, gNB 104 transmits the MDT activation message to the selected UE(s). In this case, if the MDT activation at block 501 is for the Logged MDT, the Logged MDT configuration should be sent to the selected UE(s). If the original MDT configuration is flexible (i.e., allowed to be modified), the gNB can configure the selected UE(s) using the modified MDT configuration, as determined at 506. For example, the gNB may update the logging duration information or a report type field from periodical to event based, or vice versa. In addition, the gNB may choose a different logging interval from the one selected by the OAM.

The Logged MDT trace session is preserved in the UE until the duration time (or the logging duration) of the trace session expires, including also multiple idle or inactive periods interrupted by various RRC state transitions such as idle-connected-idle state transitions. The UE may collect MDT measurements and log according to the received MDT configuration until its memory reserved for the MDT is full. If this happens, UE stops logging, stops the log duration timer and starts the 48 hour timer.

If the MDT activation in block 501 is for Immediate MDT and includes measurements to be performed by the UE, the corresponding MDT measurements or updated MDT measurements according to the modified MDT configuration are configured towards the UE. The MDT measurements corresponding to the Immediate MDT measurement configuration are deleted in the UE together with the RRC context when entering an RRC idle or inactive mode.

The blocks 509 to 513 are the same with blocks 307 to 311, thus the explanation of the blocks 509 to 513 can be referred to the explanations thereof.

At 512, gNB 104 may forward the Trace Records (e.g., the MDT record report) that have been measured by the one or more selected UEs to the Trace Collection Entity (TCE) 110-1 identified by the TCE ID in the MDT record report provided by the UE.

In case of Logged MDT, the TCE ID is translated to the actual IP address of the TCE by the gNB before it forwards the measurements (e.g., the MDT records). The address translation is based on mapping configured in the gNB. In case of Immediate MDT, the IP address of the TCE is indicated for the gNB in the trace configuration. If the trace record (MDT record) corresponds to the flexible MDT configuration, the gNB may forward the actual (flexible) MDT Configuration that was modified by the gNB to the TCE together with the Trace Records.

At 515, TCE 110-1 combines the MDT recodes with the TAC based on the trace reference and the TRSR. That is, a correlation of MDT measurements is obtained via the Logged and Immediate MDT record is possible to some extent.

Figure 6:
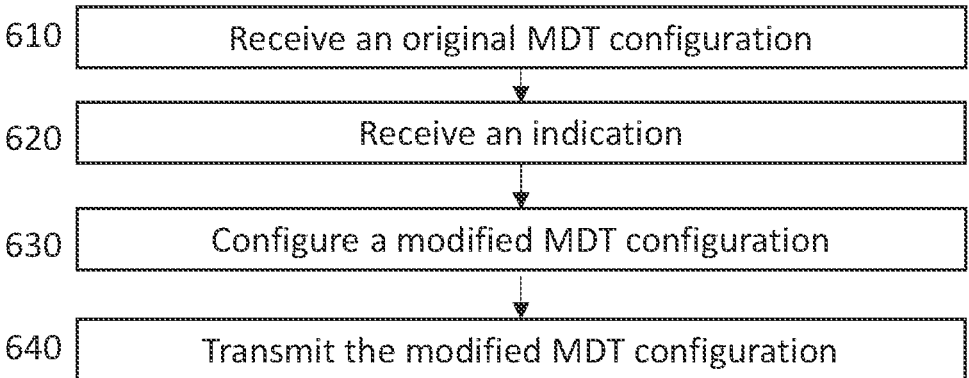
FIG. 6 illustrates a flowchart of a flexible MDT configuration process according to some example embodiments of the present disclosure.

FIG. 6 illustrates a flowchart of a flexible MDT configuration process according to some example embodiments of the present disclosure. The method 600 may be implemented at the network node 104 shown in FIGS. 1 and 3 to 5. For the purpose of discussion, the method 600 will be described with reference to FIG. 1.

At 610, the network node 104 receives an original minimization of driving test, MDT, configuration from the network entity 113.

At 620, the network node 104 receives an indication indicating whether all or a part of the original MDT configuration is allowed to be modified, from the network entity 113.

At 630, the network node 104 configures a modified MDT configuration from the original MDT configuration based on the indication.

At 640, the network node 104 transmits the modified MDT configuration to at least one of the user device 100 or the network entity 113.

In some example embodiments, the network node 104 receives at least one of a list of parameters allowed to be modified or at least one rule of how to modify the original MDT configuration, wherein the list of parameters indicates one or more parameters of the original MDT configuration. In addition, the network node configure the modified MDT configuration based on the at least one of the list of parameters or the at least one rule.

In some example embodiments, the modified MDT configuration may be configured for a specific user device or a group of user devices.

In some example embodiments, the network node 104 may receive one or more MDT measurements, wherein the one or more MDT measurements include at least one logged measurements or immediate measurements according to the modified MDT configuration and transmit an MDT report based on the one or more MDT measurements.

In some example embodiments, the network node 104 may transmit the original MDT configuration to one or more user devices; and receive one or more MDT measurements including at least one Logged MDT measurements or Immediate MDT measurement according to the original MDT configuration.

In some example embodiments, the original MDT configuration may be transmitted less frequently than the modified MDT configuration.

In some example embodiments, the original MDT configuration is periodically transmitted and the modified MDT configuration is transmitted in an event triggered manner.

In some example embodiments, the network device may receives one or more user equipment capability information from one or more user devices; and selects at least one of the one or more user devices for the modified MDT configuration based at least on the one or more user equipment capability information and area information of the one or more user equipment. In this case, the modified MDT configuration is modified based on the one or more user equipment capability information and the modified MDT configuration is transmitted to the selected at least one of the one or more user devices.

In some example embodiments, the apparatus may be the network node or the apparatus is comprised in the network node.

Figure 7:
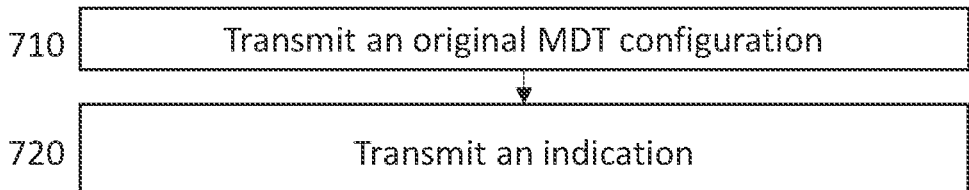
FIG. 7 illustrates a flowchart of a flexible MDT configuration process according to some example embodiments of the present disclosure.

FIG. 7 illustrates a flowchart of a flexible MDT configuration process according to some example embodiments of the present disclosure. The method 700 may be implemented at the network entity 113 shown in FIGS. 1 and 3 to 5. For the purpose of discussion, the method 700 will be described with reference to FIG. 1.

At 710, the network entity 113 may transmit, to the network node 104, an original minimization of driving test, MDT, configuration.

At 720, the network entity 113 may transmit, to the network node 104, an indication indicating whether all or a part of the original MDT configuration is allowed to be modified.

In some example embodiments, the network entity 113 may transmit, to the network node, at least one of a list of parameters allowed to be modified or at least one rule of how to modify the original MDT configuration. In this case, the list of parameters indicates one or more parameters of the original MDT configuration. Then, the network entity 113 may receive, from the network node, the modified MDT configuration, wherein the modified MDT configuration is configured based on the at least one of the list of parameters or the at least one rule.

In some example embodiments, the network entity 113 may receive, from the network node, an MDT report which is configured based on the modified MDT configuration.

Figure 8:
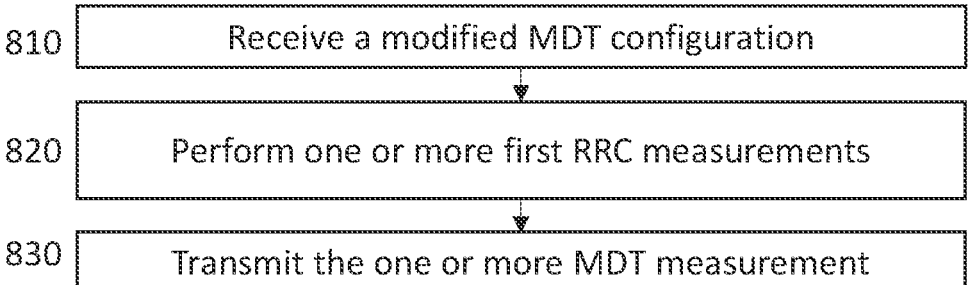
FIG. 8 illustrates a flowchart of a flexible MDT configuration process according to some example embodiments of the present disclosure.

In some example embodiments, the network entity may be one of an operation and maintenance, OAM, node and a network data analytics function, NDAF. FIG. 8 illustrates a flowchart of a flexible MDT configuration process according to some example embodiments of the present disclosure. The method 800 may be implemented at user device 100 shown in FIGS. 1 and 3 to 5. For the purpose of discussion, the method 800 will be described with reference to FIG. 1.

At 810, the user device 100 may receive, from a network node, a modified minimization of driving test, MDT, configuration, the modified MDT configuration is modified from an original MDT configuration by the network node.

At 820, the user device 100 may perform one or more first MDT measurements according to the modified MDT configuration.

At 830, the user device 100 may transmit, to the network node, the one or more first MDT measurements.

In some example embodiments, the one or more first MDT measurements may include at least one Logged MDT measurements or Immediate MDT measurements according to the modified MDT configuration.

In some example embodiments, the user device 100 may receive an original MDT configuration from the network node and perform one or more second MDT measurements according to the original MDT configuration.

In some example embodiments, the original MDT configuration may be received less frequently than the modified MDT configuration.

In some example embodiments, the original MDT configuration may be periodically received, and the modified MDT configuration may be received in an event triggered manner.

Figure 9:
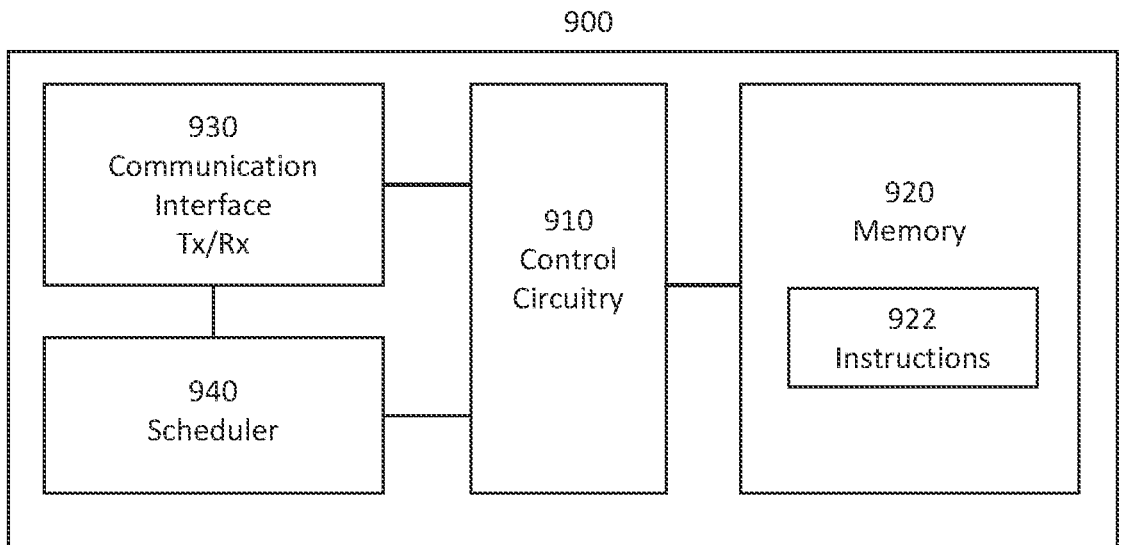
FIG. 9 illustrates an example of an apparatus comprising means for performing one or more of the example embodiments.

FIG. 9 illustrates an example of an apparatus 900 comprising means for performing one or more of the example embodiments described above. For example, the apparatus 900 may be an apparatus such as, or comprising, or comprised in, the network entity 113, the network node 104, or the user device 100, and support the embodiments described above.

The network node 104 may also be referred to, for example, as a network element, a next generation radio access network (NG-RAN) node, a NodeB, an eNB, a gNB, a base transceiver station (BTS), a base station, an NR base station, a 5G base station, an access node, an access point (AP), a cell site, a relay node, a repeater, an integrated access and backhaul (IAB) node, an IAB donor node, a distributed unit (DU), a central unit (CU), a baseband unit (BBU), a radio unit (RU), a radio head, a remote radio head (RRH), or a transmission and reception point (TRP).

The apparatus 900 may comprise, for example, a circuitry or a chipset applicable for realizing one or more of the example embodiments described above. The apparatus 900 may be an electronic device comprising one or more electronic circuitries. The apparatus 900 may comprise a communication control circuitry 910 such as at least one processor, and at least one memory 920 storing instructions 922 which, when executed by the at least one processor, cause the apparatus 900 to carry out one or more of the example embodiments described above. Such instructions 922 may, for example, include computer program code (software). The at least one processor and the at least one memory storing the instructions may provide the means for providing or causing the performance of any of the methods and/or blocks described above.

The processor is coupled to the memory 920. The processor is configured to read and write data to and from the memory 920. The memory 920 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The memory 920 stores computer readable instructions that are executed by the processor. For example, non-volatile memory stores the computer readable instructions, and the processor executes the instructions using volatile memory for temporary storage of data and/or instructions.

The computer readable instructions may have been pre-stored to the memory 920 or, alternatively or additionally, they may be received, by the apparatus, via an electromagnetic carrier signal and/or may be copied from a physical entity such as a computer program product. Execution of the computer readable instructions causes the apparatus 900 to perform one or more of the functionalities described above.

The memory 920 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data, such as a current neighbour cell list, and, in some example embodiments, structures of frames used in the detected neighbour cells.

In some example embodiments a non-transitory computer readable medium may be provided. The non-transitory computer readable medium may comprise program instructions which, when executed by an apparatus, cause the apparatus to perform at least the following: receiving an original minimization of driving test, MDT, configuration; receiving an indication indicating whether all or a part of the original MDT configuration is allowed to be modified; configuring a modified MDT configuration from the original MDT configuration based on the indication; and transmitting the modified MDT configuration.

In some example embodiments a non-transitory computer readable medium may be provided. The non-transitory computer readable medium may comprise program instructions which, when executed by an apparatus, cause the apparatus to perform at least the following: transmitting, to a network node, an original minimization of driving test, MDT, configuration; and transmitting, to the network node, an indication indicating whether all or a part of the original MDT configuration is allowed to be modified.

In some example embodiments a non-transitory computer readable medium may be provided. The non-transitory computer readable medium may comprise program instructions which, when executed by an apparatus, cause the apparatus to perform at least the following: receiving, from a network node, a modified minimization of driving test, MDT, configuration, the modified MDT configuration is modified from an original MDT configuration by the network node; performing one or more first MDT measurements according to the modified MDT configuration; and transmitting, to the network node, the one or more first MDT measurements.

Referring back to FIG. 9, the apparatus 900 may further comprise or be connected to a communication interface 930, such as a radio unit, comprising hardware and/or software for realizing communication connectivity with one or more wireless communication devices according to one or more communication protocols. The communication interface 930 comprises at least one transmitter (Tx) and at least one receiver (Rx) that may be integrated to the apparatus 900 or that the apparatus 900 may be connected to. The communication interface 930 may provide means for performing some of the blocks for one or more example embodiments described above. The communication interface 930 may comprise one or more components, such as: power amplifier, digital front end (DFE), analog-to-digital converter (ADC), digital-to-analog converter (DAC), frequency converter, (de) modulator, and/or encoder/decoder circuitries, controlled by the corresponding controlling units.

The communication interface 930 provides the apparatus with radio communication capabilities to communicate in the wireless communication network. The communication interface may, for example, provide a radio interface to one or more wireless communication devices. The apparatus 900 may further comprise or be connected to another interface towards a core network such as the network coordinator apparatus or AMF, and/or to the access nodes of the wireless communication network.

The apparatus 900 may further comprise a scheduler 940 that is configured to allocate radio resources. The scheduler 940 may be configured along with the communication control circuitry 910 or it may be separately configured.

It is to be noted that the apparatus 900 may further comprise various components not illustrated in FIG. 9. The various components may be hardware components and/or software components.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s), software, and memory (ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of example embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the example embodiments described above, but may vary within the scope of the claims. Therefore, all words and expressions should be interpreted broadly, and they are intended to illustrate, not to restrict, the embodiments.

What is claimed is:

1. An apparatus for a Radio Access Network (RAN) node comprising:

at least one processor; and at least one memory storing instructions that, when executed by the at least one processor, cause the apparatus at least to:

receive, from an Operation Administration and Maintenance (OAM) function, a trace session activation request message that comprises:

an original Minimization of Driving Test (MDT) configuration, wherein the original MDT configuration comprises one or more parameters for configuring MDT measurements;

a job type field specifying at least one of a logged MDT, an immediate MDT, or a combination of the logged MDT and the immediate MDT; and a flag indicating whether the original MDT configuration is modifiable;

wherein the flag is set to a first value to indicate that the original MDT configuration is modifiable, and the flag is set to a second value to indicate that the original MDT configuration is not modifiable, wherein, in response to the flag being set to the first value, the trace session activation request message further comprises one or more modifications to the original MDT configuration, wherein the one or more modifications are classified as a restricted type or an unrestricted type, and wherein the unrestricted type authorizes the apparatus to update the one or more parameters based on a predefined data requirement of the apparatus, and wherein the restricted type provides a list of modifiable parameters from the one or more parameters or at least one rule to modify the one or more parameters;

store the received one or more parameters in a non-user equipment associated context;

receive, from an Access and Mobility Management Function (AMF) within one of an Initial Context Setup Request message or a handover request message, a management-based MDT allowed Information Element (IE) comprising a management-based MDT Public Land Mobile Network (PLMN) list, wherein the PLMN list includes a plurality of PLMNs;

based on the PLMN list, serve one or more User Equipments (UEs);

store, within a UE context associated with each of the one or more UEs, an indication that the management-based MDT is allowed;

select at least one UE, from the one or more UEs, for MDT data collection, wherein the apparatus selects the at least one UE based on at least one of:

area information received via the original MDT configuration;

an area where the at least one UE is located; and user consent information received, from the AMF, in the management-based MDT allowed Information Element (IE);

determine that the flat is set to the first value;

based on the flag being set to the first value, determine to modify the original MDT configuration;

based on the determination to modify the original MDT configuration, generate a modified MDT configuration by modifying the original MDT configuration, wherein modifying the original MDT configuration comprises one of:

in response to the modifications being defined as the unrestricted type, modifying the original MDT configuration based on the predefined data requirement of the RAN node; or in response to the modifications being defined as the restricted type, modifying the original MDT configuration based on the provided list of modifiable parameters or the at least one rule;

transmit, the modified MDT configuration, to a Trace Collection Entity (TCE) and the selected at least one UE;

based on the received original MDT configuration, determine an anonymization level for the MDT data to be collected from the at least one UE;

in response to determining that the anonymization level requires an International Mobile Equipment Identity-Type Allocation Code (IMEI-TAC) in the MDT data, transmit, to the AMF, a cell traffic trace message comprising a trace recording session reference (TRSR), a trace reference (TR), a serving cell global identifier (CGI), an IP address, and a privacy indicator, wherein the privacy indicator indicates, to the AMF, to:

retrieve IMEI-TAC of the selected at least one UE from AMF database, and transmit, to the TCE, the IMEI-TAC, the TRSR, and the TR; and in response to determining that the anonymization level does not require the IMEI-TAC in the MDT data, refrain from transmitting the cell traffic trace message to the AMF thereby avoiding transmission of an identity of the selected at least one UE to the TCE;

receive, from the selected at least one UE, the MDT data collected based on the modified MDT configuration;

store the received MDT data in a trace record; and transmit the trace record to the TCE.

2. He apparatus according to claim 1, wherein the modified MDT configuration is configured for the selected at least one UE.

3. A method performed by a Radio Access Network (RAN) node comprising:

receiving, from an Operation, Administration, and Maintenance (OAM) function, a trace session activation request message that comprises:

an original Minimization of Driving Test (MDT) configuration, wherein the original MDT configuration comprises one or more parameters for configuring MDT measurements;

a job type field specifying at least one of a logged MDT, an immediate MDT, or a combination of the logged MDT and the immediate MDT; and a flag indicating whether the original MDT configuration is modifiable, wherein the flag is set to a first value to indicate that the original MDT configuration is modifiable, and the flag is set to a second value to indicate that the original MDT configuration is not modifiable, wherein when the flag is set to the first value, the trace session activation request message further comprises one or more modifications to the original MDT configuration, wherein the one or more modifications are classified as a restricted type or an unrestricted type, wherein the unrestricted type authorizes the apparatus to update the one or more parameters based on a predefined data requirement of the apparatus, and wherein the restricted type provides a list of modifiable parameters from the one or more parameters or at least one rule to modify the one or more parameters;

storing the received one or more parameters in a non-user equipment associated context;

receiving, from an Access and Mobility Management Function (AMF) within one of an Initial Context Setup Request message or a handover request message, a management-based MDT allowed Information Element (IE) comprising a management-based MDT Public Land Mobile Network (PLMN) list, wherein the PLMN list includes a plurality of PLMNs;

based on the PLMN list, serving one or more User Equipments (UEs);

storing, within a UE context associated with each of the one or more UEs, an indication that the management-based MDT is allowed;

selecting at least one UE from the one or more UEs for MDT data collection, wherein the apparatus selects the at least one UE based on:

area information received via the original MDT configuration;

an area where the at least one UE is located; and user consent information received from the AMF in the management-based MDT allowed Information Element (IE);

determine the flag is set to the first value;

based on the flag being set to the first value, determining to modify the original MDT configuration;

based on the determination to modify the original MDT configuration, generating a modified MDT configuration by modifying the original MDT configuration, wherein modifying the original MDT configuration comprises one of:

in response to the modifications being defined as the unrestricted type, modifying the original MDT configuration based on the predefined data requirement of the RAN node; or in response to the modifications being defined as the restricted type, modifying the original MDT configuration based on the provided list of modifiable parameters or the at least one rule;

transmitting, the modified MDT configuration, to a Trace Collection Entity (TCE) and the selected at least one UE;

based on the received original MDT configuration, determining an anonymization level for the MDT data to be collected from the at least one UE;

in response to determining that the anonymization level does not require the IMEI-TAC in the MDT data, refraining from transmitting the cell traffic trace message to the AMF and avoiding transmission of an identity of the selected at least one UE to the TCE;

receiving, from the selected at least one UE, the MDT data collected based on the modified MDT configuration;

storing the received MDT data in a trace record; and transmitting the trace record to the TCE.

4. The method according to claim 3, wherein the modified MDT configuration is configured for the selected at least one UE.

5. A non-transitory computer readable medium comprising program instructions for a Radio Access Network (RAN) node which, when executed by an apparatus, cause the apparatus at least to:

receiving, from an Operation, Administration, and Maintenance (OAM) function, a trace session activation request message that comprises:

an original, Minimization of Driving Test (MDT) configuration, wherein the original MDT configuration comprises one or more parameters for configuring MDT measurements;

a job type field specifying at least one of a logged MDT, an immediate MDT, or a combination of the logged MDT and the immediate MDT; and a flag indicating whether the original MDT configuration is modifiable, wherein the flag is set to a first value to indicate that the original MDT configuration is modifiable, and the flag is set to a second value to indicate that the original MDT configuration is not modifiable, wherein, in response to the flag being set to the first value, the trace session activation request message further comprises one or more modifications to the original MDT configuration, wherein the one or more modifications are classified as a restricted type or an unrestricted type, and wherein the unrestricted type authorizes the apparatus to update the one or more parameters based on a predefined data requirement of the apparatus, and wherein the restricted type provides a list of modifiable parameters from the one or more parameters or at least one rule to modify the one or more parameters:

store the received one or more parameters in a non-user equipment associated context;

receiving, from an Access and Mobility Management Function (AMF) within one of an Initial Context Setup Request message or a handover request message, a management-based MDT allowed Information Element (IE) comprising a management-based MDT Public Land Mobile Network (PLMN) list, wherein the PLMN list includes a plurality of PLMNs;

based on the PLMN list, serving one or more User Equipments (UEs);

storing, within a UE context associated with each of the one or more UEs, an indication that the management-based MDT is allowed;

selecting at least one UE, from the one or more UEs, for MDT data collection, wherein the apparatus selects the at least one UE based on at least one of:

area information received via the original MDT configuration;

an area where the at least one UE is located; and user consent information received, from the AMF, in the management-based MDT allowed Information Element (IE);

determining the flag is set to the first value;

based on the flag being set to the first value, determining to modify the original MDT configuration;

based on the determination to modify the original MDT configuration, generating a modified MDT configuration by modifying the original MDT configuration, wherein modifying the original MDT configuration comprises one of:

in response to the modifications being defined as the unrestricted type, modifying the original MDT configuration based on the predefined data requirement of the RAN node; or in response to the modifications being defined as the restricted type, modifying the original MDT configuration based on the provided list of modifiable parameters or the at least one rule;

transmitting the modified MDT configuration to a Trace Collection Entity (TCE) and the selected at least one UE;

based on the received original MDT configuration, determining an anonymization level for the MDT data to be collected from the at least one UE;

based on determining that the anonymization level requires an International Mobile Equipment Identity-Type Allocation Code (IMEI-TAC) in the MDT data, transmit, to the AMF, a cell traffic trace message comprising a trace recording session reference (TRSR), a trace reference (TR), a serving cell global identifier (CGI), an IP address, and a privacy indicator, wherein the privacy indicator indicates, to the AMF, to:

retrieve IMEI-TAC of the selected at least one UE from AMF database, and transmit, to the TCE, the IMEI-TAC, the TRSR, and the TR; and receiving, from the selected at least one UE, the MDT data collected based on the modified MDT configuration;

storing the received MDT data in a trace record; and transmiting the trace record to the TCE.

6. The non-transitory computer readable medium according to claim 5, wherein the modified MDT configuration is configured for the selected at least one UE.

7. The non-transitory computer readable medium according to claim 6, wherein the one or more parameters of the original MDT configuration comprise at least one of: a reporting trigger, a report interval, a report amount, an event threshold, a logging interval, a logging duration, a positioning method, or sensor information.

8. The non-transitory computer readable medium according to claim 7, wherein the job type field specifies logged MDT, and wherein generating the modified MDT configuration comprises modifying at least one of: a logged MDT logging interval, a logged MDT logging duration, an area configuration for neighboring cells, or a report type for logged MDT that switches between periodic logging and event-triggered logging.

9. The non-transitory computer readable medium according to claim 8, wherein the job type field specifies immediate MDT, and wherein generating the modified MDT configuration comprises modifying at least one of: a set of immediate MDT measurements, a reporting trigger, a reporting interval, or an excess packet delay threshold for packet delay measurement.

10. The non-transitory computer readable medium according to claim 9, wherein, when the modifications are classified as the restricted type, the list of modifiable parameters explicitly identifies at least one of: reporting trigger, report interval, logging interval, logging duration, event threshold, hysteresis, time-to-trigger, sensor information, or a positioning method, and the apparatus modifies only parameters included in the list.

11. The non-transitory computer readable medium according to claim 9, wherein, when the modifications are classified as the restricted type, the at least one rule comprises at least one of: (i) selecting a modified periodicity from a set of alternative periodicities provided by the OAM function, (ii) selecting a modified logging interval from a set of alternative logging intervals provided by the OAM function, or (iii) selecting an event trigger from a set of alternative event triggers provided by the OAM function.

12. The non-transitory computer readable medium according to claim 9, wherein, when the modifications are classified as the unrestricted type, the predefined data requirement comprises a data requirement associated with at least one AI/ML operation executed at the apparatus, the AI/ML operation comprising at least one of: training an AI/ML model, re-training an AI/ML model, monitoring AI/ML model performance, or executing AI/ML model inference.

13. The non-transitory computer readable medium according to claim 12, wherein the apparatus is further caused to receive, from each of the one or more UEs, UE capability information indicating at least one of: an AI/ML capability of the UE, an available memory of the UE, or a UE power status, and wherein selecting the at least one UE further comprises selecting the at least one UE based on the UE capability information.

14. The non-transitory computer readable medium according to claim 13, wherein transmitting the modified MDT configuration to the TCE comprises transmitting the modified MDT configuration only once per UE for which the modified MDT configuration is generated, and wherein the modified MDT configuration is identified at the TCE using at least one of a trace reference (TR) or a trace recording session reference (TRSR).

15. The non-transitory computer readable medium according to claim 13, wherein transmitting the modified MDT configuration to the selected at least one UE comprises transmitting, to the selected at least one UE, both (i) the original MDT configuration and (ii) the modified MDT configuration, and wherein the selected at least one UE performs MDT measurements according to both configurations and reports MDT data corresponding to each configuration to the apparatus.

\* \* \* \* \*